United States Patent
Boney et al.

(10) Patent No.: US 6,837,309 B2
(45) Date of Patent: Jan. 4, 2005

(54) METHODS AND FLUID COMPOSITIONS DESIGNED TO CAUSE TIP SCREENOUTS

(75) Inventors: Curtis L. Boney, Houston, TX (US); Dean M. Willberg, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 148 days.

(21) Appl. No.: 10/214,817

(22) Filed: Aug. 8, 2002

(65) Prior Publication Data

US 2003/0062160 A1 Apr. 3, 2003

Related U.S. Application Data

(60) Provisional application No. 60/318,764, filed on Sep. 11, 2001.

(51) Int. Cl.$^7$ ............................................. E21B 43/269
(52) U.S. Cl. .................. 166/280.2; 166/281; 166/308.1
(58) Field of Search ........................... 166/308.1, 308.5, 166/280.2, 281; 507/927

(56) References Cited

U.S. PATENT DOCUMENTS

| | | | | |
|---|---|---|---|---|
| 4,074,760 | A | * | 2/1978 | Copeland et al. ............ 166/276 |
| 5,054,554 | A | | 10/1991 | Pearson ....................... 166/280 |
| 5,247,995 | A | | 9/1993 | Tjon-Joe-Pin ................ 166/312 |
| 5,325,921 | A | | 7/1994 | Johnson et al. .............. 166/280 |
| 5,330,005 | A | | 7/1994 | Card et al. .................. 166/280 |
| 5,439,055 | A | | 8/1995 | Card et al. .................. 166/280 |
| 5,501,275 | A | | 3/1996 | Card et al. .................. 166/280 |
| 5,722,490 | A | | 3/1998 | Ebinger ....................... 166/281 |
| 5,782,300 | A | | 7/1998 | James et al. ................. 166/278 |
| 5,783,527 | A | | 7/1998 | Dobson, Jr. .................. 507/269 |
| 5,813,463 | A | * | 9/1998 | Stadulis ....................... 166/280 |
| 5,908,073 | A | | 6/1999 | Nguyen ....................... 166/276 |
| 6,016,871 | A | | 1/2000 | Burts, Jr. ..................... 166/300 |
| 6,076,046 | A | | 6/2000 | Vasudevan .................... 702/12 |
| 6,364,015 | B1 | * | 4/2002 | Upchurch ................. 166/250.1 |
| 6,494,263 | B2 | | 12/2002 | Todd ........................... 166/312 |
| 2003/0034160 | A1 | * | 2/2003 | Nguyen et al. ............. 166/278 |

OTHER PUBLICATIONS

Search Report PCT/EP/02/10126.*
SPE 23844 Fracturing Unconsolidated Sand Formations Offshore Gulf Of Mexico—F.L.Monus, F.W.Broussard, J.A.Ayoub and W.D.Norman.
SPE 71653 Screenless Tip–Screenout Fracturing: A Detailed Examination of Recent Experience—Y.Fan, M.D.Looney and J.A.Jones.
M.Economides and K.Nolte, eds., *Reservoir Stimulation*, $3^{rd}$ edition, John Wiley & Sons, Ltd, New York (2000) pp. 10–18 to 10–24.
M.Economides and K.Nolte, eds., *Reservoir Stimulation*, $3^{rd}$ edition, John Wiley & Sons, Ltd, New York (2000) pp. 11–30 and 11–31..

* cited by examiner

*Primary Examiner*—William Neuder
(74) *Attorney, Agent, or Firm*—Thomas O. Mitchell; Robin Nava; Brigitte L. Echols

(57) ABSTRACT

In stimulation treatments to increase the production of hydrocarbons from subterranean formations, especially in treatments including hydraulic fracturing followed by gravel packing, desirable short wide fractures are created and filled with proppant by deliberately including in the first fluid/proppant slurry pumped a sufficiently high concentration of a bridging-promoting material, such as fibers, that reduces the mobility of the slurry when it dewaters so that screenout at or near the tip occurs.

17 Claims, No Drawings

METHODS AND FLUID COMPOSITIONS DESIGNED TO CAUSE TIP SCREENOUTS

REFERENCE TO RELATED PROVISIONAL APPLICATION

This application claims the benefit of provisional application Ser. No. 60/318,764 filed Sep. 11, 2001.

TECHNICAL FIELD OF THE INVENTION

This Invention relates to the practice of deliberately creating short, wide fractures in the stimulation of production of fluids from subterranean formations. In particular it relates to deliberately inducing a tip screenout of injected proppant slurry, especially in conjunction with sand control measures in a combination hydraulic fracturing/gravel packing operation.

BACKGROUND OF THE INVENTION

Hydraulic fracturing is a stimulation treatment routinely performed on oil, gas and other wells to increase fluid production from reservoirs. Specially engineered fluids are pumped at high pressure and rate into the reservoir interval to be treated, causing a fracture to open. Proppant, such as grains of sand of a particular size, is slurried with the treatment fluid (usually therefore called a carrier fluid) to keep the fracture open when the treatment is complete. Hydraulic fracturing creates high-conductivity communication with a large area of a formation and bypasses any damage that may exist in the near-wellbore area. Combined fracturing and gravel packing operations are used extensively to stimulate poorly consolidated sand formations. The goal of combined fracturing and gravel packing treatments is to create short, wide, highly conductive fractures and then to pack the area between the screen and the perforated casing or the inside wellbore surface (the sandface) by continuing to inject slurry after the fracture has filled with proppant and packed off. Short, wide fractures might also be desirable in wellbores and formations in which sand control is not an issue and so gravel packing is not performed. An example would be in relatively high permeability formations in which fracture conductivity is particularly important. The most common method of creating short, wide fractures is to initiate a tip screenout during the pumping operation. In a tip screenout, the solids concentration at the tip of the fracture becomes so high due to fluid leak-off into the formation that the slurry is no longer mobile. The concentrated proppant slurry plugs the fracture, preventing additional growth of the fracture length. Additional pumping of the proppant/fluid slurry into the formation after the screenout occurs causes the fracture to balloon. The fracture grows in width rather than length, and large concentrations of proppant per surface area are placed in the fracture. The design of these treatments relies heavily on knowing the correct mechanical, permeability, reservoir pressure and fluid saturations of the formation being treated and the properties of the fluids and slurries being pumped.

The only ways currently known to cause, or increase the probability of, a tip screenout are by manipulation of parameters such as these. U.S. Pat. No. 5,054,554 describes several ways of inducing tip screenouts. In one, when the fracture has reached the desired length and a tip screenout is desired, the proppant concentration and slurry pumping rate are both lowered and the proppant concentration is then raised. In another, the proppant concentration is progressively increased until tip screenout occurs. U.S. Pat. No. 5,325,921 describes a method of inducing a tip screenout in which a very effective fluid loss additive is used in the pad, but a less effective fluid loss additive is used in the proppant stages such that leak-off becomes sufficiently high as to result in a screenout.

Prior to most hydraulic fracturing or fracturing/gravel packing treatments a small fracturing treatment (sometimes called a "data frac" or "mini-frac") is performed in order to measure the needed parameters and to determine the formation's response to a hydraulic fracturing treatment. Treatment designs are often modified on the fly to incorporate this new information. Treatment design and modification is typically done with the aid of a computer model, many of which are available in the industry.

Unfortunately, in spite of data-fracturing information, the pressure transients collected by downhole pressure gauges during treatments indicate that tip-screenouts do not occur in many, perhaps the majority, of the fracturing or combined fracturing/gravel packing treatments in which they are desired and intended. The fluid at the tip of the fracture remains mobile, the fracture tip continues to grow throughout the treatment and the desired fracture dimensions and proppant concentration in the fracture is not reached. Therefore, the desired fracture conductivity is not obtained. Often, tip screenouts have to be coaxed by, for example, dropping pump rates at the time a tip screenout is desired.

There is a need for a more reliable way to ensure that intended tip screenouts will occur where they are wanted in stimulation treatments and to allow for more flexibility in design of stimulation treatments in which tip screenouts are desired.

SUMMARY OF THE INVENTION

In one embodiment, tip screenouts are induced when desired by adding bridging-promoting agents to the proppant slurry. In a particularly preferred embodiment the bridging-promoting agents are fibers that are added to the proppant slurry at higher concentrations than are normally used for flowback control and the fibers are added early in the treatment to initiate proppant bridging and cause a tip screenout during pumping. Another embodiment of this Invention is deliberately to induce tip screenouts by the use of high concentrations of bridging-promoting agents early in stimulation treatments. Another embodiment of this Invention is deliberately to induce tip screenouts by the use of high concentrations of bridging-promoting agents early in the treatment in combination stimulation/gravel packing treatments, in particular hydraulic fracturing/gravel packing. It is a further embodiment of this Invention deliberately to induce tip screenouts by the use of high concentrations of bridging-promoting agents early in a treatment in combination stimulation/gravel packing treatments in which annular screens are used. Yet another embodiment of this Invention is to use an appropriate choice of treatment parameters to induce tip screenouts but in addition to use high concentrations of bridging-promoting agents early in treatments to increase the probability that a tip screenout will occur. Yet other embodiments are the preceding methods in which bridging-promoting agents are added later in the treatment. It is a further embodiment of the Invention to provide a way to induce tip screenouts in treatments in which it would otherwise have been difficult, or expensive, or inefficient, or even impossible to do so, thus giving the operator an additional means to control the treatment. Another embodiment is a proppant slurry containing sufficient bridging-promoting agent to cause the slurry to screen out when injected into a fracture. The unifying concept is the addition of a sufficient amount of a bridging-promoting material to the proppant at the appropriate time in a treatment to cause formation of an immobile slurry when the slurry dewaters, which results in a screenout.

DETAILED DESCRIPTION OF PREFERRED EMBODIMENTS

We shall use the term "conventional fracturing" here to refer to hydraulic fracturing in which a tip screenout is neither intended nor desired. We shall use the term "tip screenout" to mean a screenout that is in the fracture and not in the wellbore, but is not necessarily in the end of the fracture away from the wellbore. In conventional fracturing, modes of operation that might induce a tip screenout are avoided. If a tip screenout is encountered in a conventional fracturing operation, as inferred from an increase in pumping pressure, before the entire designed treatment is pumped, some change may be made on the fly in the job parameters, for example pump rate or proppant concentration, to try to minimize the tendency toward tip screenout. Frequently, however, the treatment is stopped and considered to be a failure.

Design features typically employed in those special situations in which a tip screenout is desired typically involve methods of ensuring that fluid leak-off is high relative to the rate and amount of proppant injection. This can be achieved by using a small pad, using little or no fluid loss additive or a fluid loss additive that is not very effective, using higher proppant concentrations earlier in the treatment, pumping more slowly, and other methods known to those skilled in the art of fracturing and gravel packing. Screenouts begin with bridging, that is solids in the fracture cease moving while the liquids can continue to flow; important parameters affecting bridging propensity at a given location in the fracture are particle size, fracture width and the volume concentration of proppant in the slurry. For a discussion of the inter-relationship of tip screenouts and job design, see M. Economides and K. Nolte, eds., *Reservoir Stimulation*, $3^{rd}$ edition, John Wiley & Sons, Ltd, New York (2000) pp 10–18 to 10–24. For an explanation of combined hydraulic fracturing/gravel packing operations, see F. L. Monus, F. W. Broussard, J. A. Ayoub and W. D. Norman, "Fracturing Unconsolidated Sand Formations Offshore Gulf of Mexico," SPE 24844, (1992).

One current way to prevent tip screenouts is to design the job so that the fracture is too wide for bridging of the size of proppant being used to occur. Conversely, one way to promote tip screenouts would be to add a material that assists or promotes bridging and stops the movement of proppant in the fracture. We have found that certain materials, when added to a proppant slurry in adequate concentrations, will promote or assist bridging of the proppant particles (by significantly increasing and reinforcing the magnitude of interparticle interactions) and stop the movement of the proppant in the fracture. We term these materials "bridging-promoting materials" or agents. We have found that a tip screenout can be induced during a job, whether or not the job was designed for a tip screenout, by adding the appropriate amount of bridging-promoting materials to the proppant slurry. Although we will discuss the Invention primarily with fibers as an example, other materials could also be used as bridging-promoting agents, such as needles, fibrillated fibers, platelets, irregular particles, shavings, and ribbons, especially but not limited to materials with aspect ratios greater than about three, most preferably greater than about three hundred. Any organic or inorganic, natural or synthetic material is suitable that would decrease the mobility of a fluid/proppant slurry as it dewaters. Materials with aspect ratios greater than about three would be preferred because they would tend to leave a proppant pack with a greater permeability. Particularly suitable, but not limiting, fibers and other materials are described in U.S. Pat. Nos. 5,330,005; 5,439,055; 5,501,275; and 5,782,300, which are hereby incorporated by reference. More than one bridging-promoting material may be used in a single treatment, either sequentially or simultaneously. The materials from which the bridging-promoting agents are made is not a key variable provided that the mobility reducing agents do not chemically interact with other components of the fluids in which they are used, are stable in the environment in which they are used, and they and slurries containing them can be handled, mixed and pumped by the equipment available.

Fibers are used in conventional hydraulic fracturing to prevent proppant flowback, that is, to hold the proppant in the fracture so that it is not produced along with fluids. This allows more aggressive (higher rate) flowback of fracture fluid and of produced hydrocarbon without flowback of proppant. Resin coated proppants were designed to serve the same purpose but fibers are often better. The use of fibers in this way is described in M. Economides and K. Nolte, eds., *Reservoir Stimulation*, $3^{rd}$ edition, John Wiley & Sons, Ltd, New York (2000) pp. 11–30 and 11–31; and in U.S. Pat. Nos. 5,330,005; 5,439,055; 5,501,275; and 5,782,300.

The parameters chosen in the use of fibers to control proppant flowback in conventional hydraulic fracturing are selected on the basis of what is desired to occur in the fracture after the treatment is completed. Fiber is added at an optimal concentration to control proppant flowback, while not significantly impacting fracture conductivity. If one is using glass fibers, this concentration is approximately 1 weight per cent by weight of the proppant. This concentration is insufficient to cause bridging during pumping under the conditions at which it is normally employed. In fact, in conventional hydraulic fracturing, the fiber concentration is deliberately selected so as not to increase the bridging tendency during pumping. In most normal hydraulic fracturing situations the fiber is added to the last stages of the treatment, so that the proppant closest to the wellbore is intermingled with fibers. Indeed, in these treatments to prevent proppant flowback, it is most critical that the region of the fracture adjacent to the wellbore is treated. Occasionally in conventional hydraulic fracturing, all the proppant-laden stages are treated with fiber; this may be done in wells where proppant flowback is a most critical issue or when fiber is added for the purpose of reducing friction pressure. However, in these treatments the fiber concentration is scaled linearly with respect to the proppant concentration. (That is, if the amount of proppant is doubled, the fiber concentration is doubled, etc.) In typical designs, the early proppant stages are relatively low in proppant and fiber; tip screenouts are not desired and if they occur they are not caused by the fibers.

Occasionally, fibers are added throughout a conventional hydraulic fracturing treatment for yet another reason: to assist in proppant transport, for example when fluid viscosity is unusually low. Tip screenouts are avoided in these treatments through careful pre-treatment job design, especially in careful selection of pumping schedules. For example, in these treatments the pad volume is increased over normal job designs to ensure that sufficient fracture width is generated prior to the proppant/fiber slurry entering the fracture. Furthermore, fiber concentrations are carefully tracked in simulated job designs, alerting engineers to the possibility of premature screenouts. Finally, since the addition of fiber is critical to proppant transport in all the stages in such designs, all of the stages must include fiber.

Thus the use of fibers to control proppant flowback when tip screenout is not desired is characterized by two main principles. First, in conventional fracture designs, the amount of fibers needed for flowback control is normally low enough that tip screenout does not occur. Second, although fibers are occasionally added throughout a treatment, for flowback control they are most commonly added at the end of a treatment (or "tailed in"), typically in the last 10 per cent of the operation. This is because it is the physical properties of the proppant pack nearest the wellbore that are of concern and that must be controlled to prevent proppant flowback. The use of fibers to assist in proppant transport in conventional fracturing is characterized by careful job design and monitoring to prevent tip screenouts. In either case when tip screenouts are not desired, they are prevented as best as possible by either the inherent mode of fiber use, or by careful job design.

From this point in the discussion on, when we refer to "per cent fiber" we mean "weight per cent of the liquid in the slurry". For simplicity, assume that the density of liquids used in fracture fluids is about 8.4 pounds per gallon. A common proppant loading is 8 pounds of proppant per gallon of liquid in the slurry. This would be referred to as 8 pounds proppant added, or 8 PPA. In this case if fiber were added in an amount equal to 1 weight percent of the weight of the liquid, it would be about 0.5 weight percent of the weight of the total slurry. Thus the amount of fiber when expressed as the weight per cent of the liquid, would be a different per cent of the weight of the slurry, depending upon the amount of proppant.

The treatments of the Invention can be performed in the field in the same way as conventional treatments with the usual equipment, chemicals, and personnel, but with the equipment modified to give the ability to add fiber if that ability is not already present. Methods of adding fiber are described in U.S. Pat. Nos. 5,501,275; and 5,782,300. Preferred, but not limiting, methods of adding fiber are by adding the fiber to the proppant before it is mixed with the fluid, adding the fiber to the fluid before it is mixed with the proppant, or by adding a slurry of fibers at some stage before the slurry is pumped downhole. Although the fiber is generally added to the fluid at about the same time as the addition of the proppant, it is possible to premix components in advance of a job, or to mix them downhole.

In a preferred method, the treatment is designed to maximize the probability of a tip screenout even if fiber were not present, and, after any additional modifications to the original treatment design that are made after the "data frac" or "mini-frac" to further increase the probability of a tip screenout, the treatment design is yet further modified to include a high concentration of fibers in the fluid. The high concentration of fiber is added at least to the early propped stages of the treatment, when the proppant concentration is from about 0 to about 8 PPA. It is particularly important to ensure that a high concentration of fiber is added to the stages in which the proppant concentration is from about 0.5 to about 6 PPA. Fiber is commonly added throughout the job. As the fiber and proppant concentration increase beyond a critical level, typically aided by an increase in solids concentration due to leak off, a screenout will occur. Since addition of high concentrations of fibers tends to reduce the mobility of the proppant slurry, or even cause an immobile slurry, it is traditionally avoided in conventional hydraulic fracturing; in the present Invention this addition is deliberate. If sand control or proppant flowback control are not needed, it may not be necessary to continue to add fibers after the tip screenout has occurred.

The treatment need not be initially designed to maximize the probability of a tip screenout even if fiber were not present. The treatment could have an otherwise conventional design except for the addition of sufficient bridging-promoting material, such as fibers, to induce a screenout. Furthermore, the fiber addition does not have to be early in the job. It is within the scope of the Invention to add increasing amounts of fiber (gradually or in steps) until a screenout occurs, or to add fiber later in a job either abruptly at a high enough concentration to cause a screenout or in increasing amounts. It would also be within the scope of the Invention to increase the proppant concentration in the slurry and/or to increase the injection rate in conjunction with adding increasing amounts of fiber or with initiating addition of fiber after pumping fiber-free slurry. Since there will be a greater tendency for screenouts to occur when the leak-off is high, the methods of the Invention could be of greater benefit when leak-off is low. However, the Invention can be used under any conditions in which fracturing, including fracturing/gravel packing is done. For example, factors that affect leak-off, such as the formation permeability or the choice of a leak-off additive or additives, if used, could affect the optimal concentration (or concentration profile) of fibers needed but would not limit there being such an optimal concentration (or concentration profile) of fibers needed.

Combined stimulation/gravel packing with deliberate tip screenout can be done in a variety of ways. Non limiting examples include the following. In the first method, a fracture with a tip screenout is created, then the wellbore is cleaned out, a screen is placed, and a gravel-pack treatment is performed. In the second method the screen and a special tool are placed before the treatment. The tip screenout fracture is formed and packed with the tool set so that injected pad and slurry go into the fracture but not into the annulus; the tool is then set so that slurry enters the annulus. The pumping rate is usually reduced to ensure annular packing. In the third method, instead of gravel and a screen another technique is used to prevent production of proppant or sand. Examples are addition of fibers to the proppant or use of resin-coated proppants just before the end of the fracturing operation. Fibers and resin-coated proppants can also be used with screens.

The methods and fluids of the Invention can also be used in stimulation methods commonly called "water-fracs" or "waterfracs" or "slickwater fracs". In water-fracs, usually to decrease the cost, as little viscosifier and proppant as possible are used to create a hydraulic fracture. This is accomplished by using very high pump rates and very high total slurry volumes. As usual, in conventional water-fracs the intention is usually to create the longest fracture possible, but if an operator wanted to stop length growth and initiate width growth, a slug of fiber, or of fiber and a higher proppant concentration, could be added.

Fiber is added in a sufficiently high concentration to induce a tip screenout. The densities of fibers, proppants and fluids each can vary, so the amount of fiber that will be high enough to induce a tip screenout depends upon the specific choices of fibers, proppants and fluids. The following discussion will be in terms of aqueous liquids and preferred fibers of the Invention, synthetic organic polymeric fibers having relatively low densities of from about 1 to about 1.5 grams/cubic centimeter. However, denser fibers, such as those made from inorganic materials such as glass or ceramics, can also be used; such fibers will have densities of up to double or more the densities of synthetic organic polymeric fibers. The amount of fiber in a liquid/fiber/proppant slurry necessary to induce a tip screenout is most closely related to the volume of fiber per volume of fiber/proppant mixture. Thus the amounts of fiber expressed below should be adjusted for the densities of the specific components involved. The higher the density of the fiber, the higher the necessary weight concentration. Also, the aspect ratio, the length, and the diameter of the fiber relative to the diameter of a proppant will affect the amount of fiber (expressed in weight per cent of liquid in the slurry) in a liquid/fiber/proppant slurry necessary to induce a tip screenout. A lower weight per cent of fiber (expressed in weight per cent of liquid in the slurry) will be necessary as the fiber diameter is decreased or the fiber length or aspect ratio are increased. These adjustments are well within the ability of those skilled in the art.

What we term "fibers" can be any fibrous material, such as natural organic fibers, comminuted plant materials, synthetic organic fibers (by non-limiting example polyester, polyaramide, polyamide, novoloid or a novoloid-type polymer), fibrillated synthetic organic fibers, glass fibers, carbon fibers, ceramic fibers, inorganic fibers, metal filaments or mixtures thereof. The fibrous material preferably has a length of about 2 to about 30 millimeters and a diameter of about 5 to about 100 microns, most preferably a length of about 2 to about 30 millimeters and a diameter of about 10 to about 100 microns. Fiber cross-sections need not be circular and fibers need not be straight. If fibrillated fibers are used, the diameters of the individual fibrils can be much smaller than the aforementioned fiber diameters.

It has been found that at concentrations of synthetic organic polymer fibers between about 1 to about 2 per cent by weight of liquid, the fiber-containing slurry behaves like a standard fracturing fluid, and can be handled with standard oilfield pumping and blending equipment. It has been tested with downhole tools and it does not plug ports. This addition of the fiber to the early proppant stages will not significantly complicate the execution of the treatment.

However, as the fracture fluid/fiber/proppant mixture enters the formation, the proppant and fiber will concentrate due to fluid leak-off. At higher concentrations the fiber greatly increases the slurry's propensity to bridge. When the fiber concentration is increased to about 4 to about 5 weight per cent by leak-off, the slurry has an appearance of wet pulp. It has been shown in the laboratory and in yard tests that about 4 to about 5 per cent synthetic organic polymer fiber in the liquid can plug a slot 6 to 12 millimeters wide. Therefore, as the fiber and proppant are concentrated in the fracture due to fluid leak-off, the slurry will have a great propensity for the proppant/fiber mixture to bridge and cause a screenout.

The amount of synthetic organic polymer fiber is preferably adjusted over the range from about 0.5 to about 2 weight per cent to account for variations in fluid efficiency. Normally, 0.5 weight per cent synthetic organic polymer fiber would not be considered high and would not cause a screenout. However, one object of the Invention is to use a fiber concentration that would result in a screenout. In some cases, for example if the fluid leak-off coefficient is relatively high, and the fluid efficiency low, then the initial fiber concentration could be reduced to about that amount. The concentration might then be in the "normal" range for a "normal", treatment, but it would be high for the treatment in question. On the other hand, if the fluid efficiency were to be unusually high, then the initial fiber concentration should be increased beyond the typical 2 per cent to induce a tip screenout. Thus the range of synthetic organic polymer fiber concentration of the Invention is from about 0.5 weight per cent of the liquid to about 3 weight per cent, preferably from about 1 weight per cent to about 2 weight per cent. In this context, by "high concentration" we mean a concentration of a specific fiber, in a specific liquid/fiber/proppant combination, high enough to very significantly increase the probability of a screenout under the conditions of the treatment.

Although in conventional hydraulic fracturing the amount of fiber used is normally determined by the amount of proppant used, so that the amount of fiber is changed if the amount of proppant is changed in different stages, in the fluids and methods of this Invention the amount of fiber used is more commonly determined by the amount of liquid used and it is more common to use a constant amount of fiber by weight of liquid.

As fiber stiffness or rigidity increases, so does the propensity to initiate bridging and screenout. However, fluid handling will become more difficult as stiffness increases. Fibers of varying stiffness or rigidity are readily available commercially. Furthermore, friction pressure during pumping often decreases due to the addition of fibers. This is an added benefit particularly in combined fracturing/gravel packing operations where the fluid is often pumped through small ports and passages. The choice of fiber can readily be made by one of ordinary skill in the art by considering the various advantages and disadvantages of different fibers as regards to cost, availability, concentration needed, ease of handling, effect on friction pressure and other factors.

Although we have referred to "tip screenouts" it would be within the scope of the Invention to generate a desired length of conventional fracture with conventional treatment parameters and then induce screenout by beginning addition of fiber (bridging-promoting material) at high concentration or by increasing the fiber concentration. Fiber may also be added to the pad, in amounts comparable to the amounts added to proppant-laden stages. Bridging-promoting material may also be added as a dry mixture with a water-soluble crosslinkable polymer and a crosslinking agent, as described in U.S. Pat. No. 6,016,871. Although fracturing followed by gravel packing is more commonly performed with a screen in place, it is within the scope of the Invention to apply the fluids and methods to treatments that are done without a screen. Although we have described the Invention in terms of hydrocarbon production, it is within the scope of the Invention to use the fluids and methods in wells intended for the production of other fluids such as water or brine, and in injection, production, or storage wells. Although we have described the Invention in terms of carrier fluids that are single aqueous liquid phases, gelled oils, emulsions or fluids foamed or energized (for example with nitrogen, carbon dioxide or mixtures thereof) may be used; adjustment to the fiber concentration due to any consequent changes in the fluid properties or proppant concentration would be made. The fiber would be added to the liquid portion of a foam. It is also to be understood that the fluids and methods of the Invention may be used to cause tip screenouts in multiple fractures, natural fractures, or wormholes or the like created by treatment with acid.

Any fracture or gravel packing fluids can be used in the Invention, provided that they are compatible with the fiber, the formation, the proppant, and the desired results of the treatment. Thus the fluid can for example be aqueous based or oil-based, acidic or basic, and can comprise one or more polymers, viscoelastic surfactants, or gelled oils. The polymers may be crosslinked. Similarly any proppant (gravel)

can be used, provided that it is compatible with the fiber, the formation, the fluid, and the desired results of the treatment. Such proppants (gravels) can be natural or synthetic, coated, or contain chemicals; more than one can be used sequentially or in mixtures of different sizes or different materials. By "proppant" we mean any particulate material selected for a particular purpose such as "propping" a fracture to keep it open or "gravel packing" a completion to prevent or minimize production of formation fines. Proppants and gravels in the same or different wells or treatments can be the same material and/or the same size as one another and the term "proppant" is intended to include gravel in this discussion. Proppants are generally approximately spherical, but need not be. In general the proppant used will have an average particle size of from about 8 to about 100 U. S. mesh, more particularly, but not limited to 40/60, 20/40, 16/20, 12/20 and 8/20 sized materials. Normally the proppant will be present in the slurry in a concentration of from about 1 PPA to about 25 PPA, preferably from about 1 to about 18 PPA, most preferably from about 1 to about 12 PPA. (PPA is "pounds proppant added" per gallon of liquid.)

Any additives normally used in such treatments may be included, again provided that they are compatible with the other components and the desired results of the treatment. Such additives can include, but are not limited to antioxidants, crosslinkers, corrosion inhibitors, breakers, delay agents, biocides, buffers, fluid loss additives, etc. The wellbores treated can be vertical, deviated or horizontal. They can be completed with casing and perforations or open hole.

A further advantage to the fluids and methods of the Invention is that they give the operator an additional parameter to adjust, that is they afford additional flexibility in designing a treatment that will screen out. Thus in situations in which the operator may not wish to decrease the pad volume, slow the pumps, decrease the proppant loading, or make other design changes, he may add fiber or increase the fiber content. Thus, in the practice of the Invention, it is preferred to design the treatment so that screenout would probably occur even without the addition of high fiber concentrations early in the treatment, and then to add high fiber concentrations early in the treatment in addition to ensure a screenout, but it is equally within the scope of the Invention to design a treatment that probably will not screen out without the addition of high fiber concentrations early in the treatment, and then to add high fiber concentrations early in the treatment. It is also within the scope of this Invention to design and start pumping a treatment that is not designed or expected to screen out at any point during the treatment and then during the treatment to decide to cause the treatment to screen out and therefore at that point to begin addition of a high fiber concentration or to increase a low fiber concentration to a high fiber concentration and cause the screenout (which would not be a tip screenout).

EXAMPLE 1

A tip screenout hydraulic fracturing job was designed and the results that would be obtained were predicted using computer simulations with FracCADE™ (Schlumberger proprietary fracture design, prediction and treatment-monitoring software). The job was designed for a 200 mD permeability sandstone formation 14 feet thick at a depth of 13,715 feet, a bottom hole static pressure of 9500 psi, and a temperature of 118° C. The proppant used was 20/40 mesh ceramic. The fracturing fluid was viscosified with 30 pounds per thousand gallons of boron-crosslinked guar in 2 per cent KCl. The job design is shown in the following table. The pump rate is in barrels per minute, the liquid volume is in gallons, the proppant concentration is in pounds of proppant per gallon of liquid and the injection time is in minutes.

| Stage Number | Pump Rate | Liquid Volume | Proppant Concentration | Injection Time |
|---|---|---|---|---|
| 1 (Pad) | 15 | 3500 | 0 | 5.5 |
| 2 | 15 | 1143 | 0.5 | 1.9 |
| 3 | 15 | 107 | 0.5 | 0.2 |
| 4 | 15 | 1201 | 1.5 | 2 |
| 5 | 15 | 1148 | 2.5 | 2 |
| 6 | 15 | 1102 | 3.5 | 2 |
| 7 | 15 | 1102 | 4.5 | 2.1 |
| 8 | 15 | 1002 | 5.5 | 2 |
| 9 | 15 | 1003 | 7.0 | 2.1 |
| 10 | 15 | 950 | 8.5 | 2.1 |
| 11 | 15 | 900 | 10 | 2.1 |
| 12 (Flush) | 15 | 4669 | 0 | 7.4 |

FracCADE™ uses the predetermined criteria to determine when a screenout will occur. Two simulations were run for this hydraulic fracturing job. The first was a conventional hydraulic fracturing tip screenout run with no fiber added. For this job, FracCADE™ predicts that screenout will occur when proppant attempts to enter a fracture that is less than 2.5 times the diameter of the proppant, or at 22 PPA, whichever comes first. In the second, a synthetic organic polymeric fiber was added to each proppant stage at a concentration of 0.6 volume per cent of the liquid in the slurry. With the fiber, FracCADE™ predicts that screenout will occur when proppant attempts to enter a fracture that is less than 3.5 times the diameter of the proppant, or at 18 PPA, whichever comes first. This is a comparatively low fiber concentration, so this was a particularly severe test. The results are shown in the following table.

| Job Parameter | Without Fiber | With Fiber |
|---|---|---|
| Propped Fracture Half Length (feet) | 101.1 | 77.1 |
| Propped Width at Wellbore (inches) | 0.348 | 0.497 |
| Averaged Propped Width (inches) | 0.235 | 0.375 |
| End of Job Net Pressure (psi) | 649 | 1033 |
| Efficiency | 0.509 | 0.533 |
| Effective Conductivity (mD-feet) | 1256 | 1947 |

It can be seen that adding the fiber resulted in a shorter, wider fracture with greater conductivity. The fluid efficiency, reflecting the amount of proppant placed using a given amount of carrier fluid, was greater with the fiber. Without fiber, the proppant packed off at 99 feet after 15 barrels of stage 6 had been pumped. With fiber, the proppant packed off at 76 feet after 22 barrels of stage 4 had been pumped.

What is claimed is:

1. A method of causing a tip screenout in a wellbore treatment, comprising injecting a slurry of a proppant in a carrier fluid above fracturing pressure, comprising adding to the slurry a sufficient amount of a bridging-promoting material to cause the slurry to screen out.

2. The method of claim 1 comprising adding a bridging-promoting material to the slurry at the start of slurry injection.

3. The method of claim 2 further comprising ceasing addition of the bridging-promoting material to the slurry after the initiation of the tip screenout.

4. The method of claim 1 comprising adding a bridging-promoting material to the slurry after the start of slurry injection.

5. The method of claim 4 further comprising ceasing addition of the bridging-promoting material to the slurry after the initiation of the tip screenout.

6. The method of claim 1 wherein the bridging-promoting material is a fibrous material selected from the group consisting of natural organic fibers, comminuted plant material, synthetic organic fibers, fibrillated synthetic organic fibers, glass fibers, carbon fibers, ceramic fibers, inorganic fibers, metal filaments and mixtures thereof.

7. The method of claim 6 wherein the synthetic organic fibers are selected from the group consisting of polyaramide, polyester, polyamide, novoloid and novoloid-type polymer.

8. The method of claim 6 wherein the fibrous material has a length of about 2 to about 30 millimeters and a diameter of about 5 to about 100 microns.

9. The method of claim 1 wherein the concentration of proppant the slurry is increased at about the same time as the bridging-promoting material is added.

10. The method of claim 1 wherein the rate of injection of the slurry is increased at about the same time as the bridging-promoting material is a added.

11. The method of claim 1 wherein the amount of bridging-promoting material is from about 0.5 to about 3 per cent of the liquid in the slurry.

12. The method of claim 1 wherein the amount of bridging-promoting material is from about 1 to about 2 per cent of the liquid in the slurry.

13. The method of claim 1 wherein the wellbore treatment is elected from the group consisting of hydraulic fracturing, hydraulic fracturing followed by gravel packing, and combined hydraulic fracturing and gravel packing.

14. The method of claim 1 wherein a sand control screen is in place before the wellbore treatment.

15. The method of claim 1 wherein the fluid component of the slurry is selected from the group consisting of emulsions, foams, and energized fluids.

16. A method of causing a tip screenout during stimulation of a subterranean formation penetrated by a wellbore containing a screen to prevent sand production comprising:

a) pumping a first fluid into the formation at a pressure sufficient to initiate and propagate one or more fractures;

b) pumping a second fluid comprising a slurry comprising a liquid, at least one proppant, and a sufficient amount of at least one bridging-promoting material to cause the slurry to screen out as the liquid leaks off into the formation;

c) pumping a third fluid comprising a slurry comprising a liquid and at least one proppant; and d) filling said one or more fractures and the annulus between the wellbore and the screen with an accumulation comprising at least one proppant.

17. A method of causing a tip screenout during stimulation of a subterranean formation penetrated by a wellbore comprising:

a) pumping a first fluid into the formation at a pressure sufficient to initiate and propagate one or more fractures;

b) pumping a second fluid comprising a slurry comprising a liquid, at least one proppant, and a sufficient amount of at least one bridging-promoting material to cause the slurry to screen out as the liquid leaks off into the formation;

c) pumping a third fluid comprising a slurry comprising a liquid and at least one proppant; and d) filling said one or more fractures with an accumulation comprising at least one proppant.

* * * * *